Figure 3:
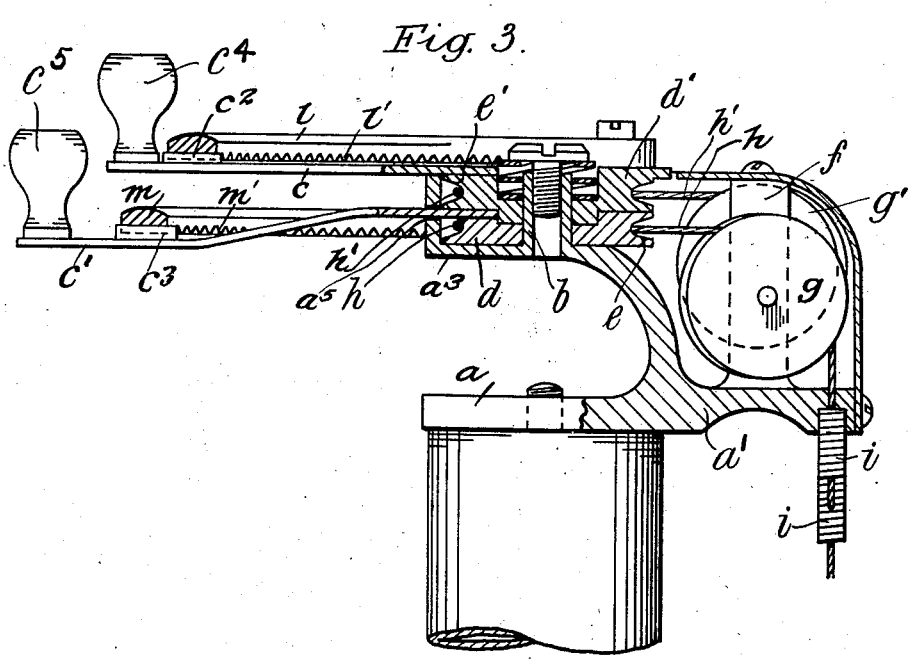

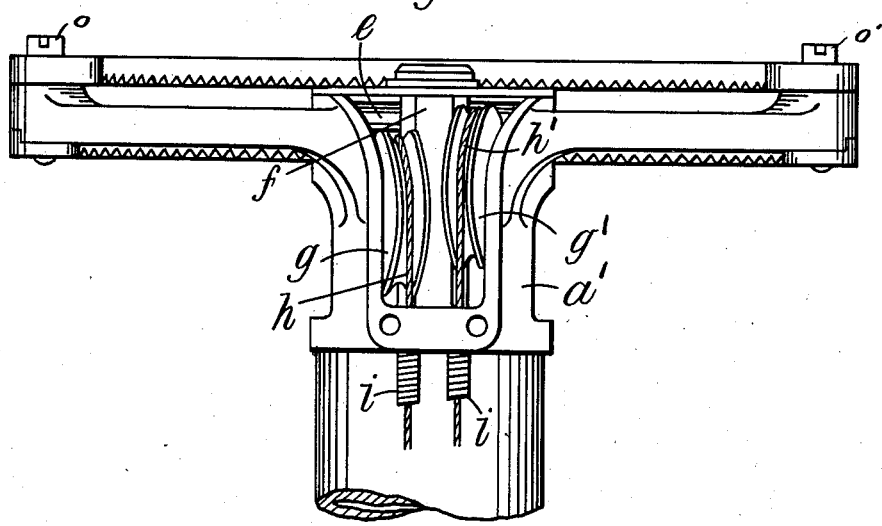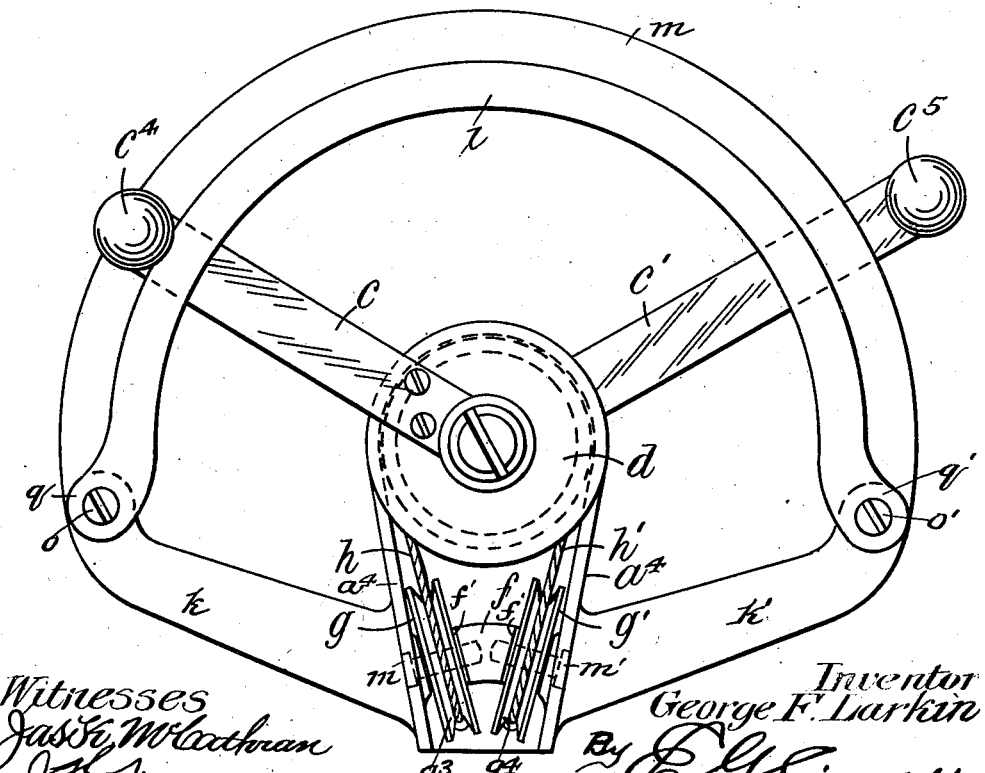

G. F. LARKIN.
CONTROLLING DEVICE FOR MOTOR VEHICLES, AIR SHIPS, &c.
APPLICATION FILED JAN. 30, 1909.

944,879.

Patented Dec. 28, 1909.

2 SHEETS—SHEET 2.

Witnesses
Jas K. McCathran

Inventor
George F. Larkin
By

UNITED STATES PATENT OFFICE.

GEORGE FREDERICK LARKIN, OF BRENTWOOD, ENGLAND.

CONTROLLING DEVICE FOR MOTOR-VEHICLES, AIR-SHIPS, &c.

944,879.  Specification of Letters Patent.  Patented Dec. 28, 1909.

Application filed January 30, 1909. Serial No. 475,090.

*To all whom it may concern:*

Be it known that I, GEORGE FREDERICK LARKIN, a subject of His Majesty the King of England, residing at Brentwood, in the Kingdom of England, have invented certain new and useful Improvements in Controlling Device for Motor-Vehicles, Air-Ships, &c.

This invention relates to a novel construction of flexible transmission controlling devices, and although the invention is applicable for use in connection with air-ships, motor boats, and the like, it is especially designed for use in connection with motor vehicles. Heretofore the controlling devices of the above-named machines have been mounted in places which were very inconvenient for the operator.

The particular object of the invention is to provide a steering gear having flexible transmission controlling devices mounted thereon, and arranged in such a compact form that the said devices are easily accessible to the operator and are consequently located in a more convenient position than has heretofore been done.

Another object of the invention is to provide a steering wheel having a plurality of pivoted controlling levers arranged to operate in the same plane as the said wheel, said levers being adapted to transmit a vertical movement to a flexible transmitting medium.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawing, Figure 1 is a front elevation of a motor vehicle controlling device, with certain parts removed for the sake of clearness and showing my invention applied therein. Fig. 2 is a top plan view of the same. Fig. 3 is a vertical transverse sectional view of the same, showing some parts in elevation.

Like reference numerals designate corresponding parts in all the figures of the drawing.

The invention comprises a steering tube of ordinary construction having suitably mounted thereon a frame having a base portion $a$ which is arranged on the steering tube, and a forwardly extending portion $a^1$. Extending upwardly and rearwardly from a point intermediate of the base $a$ and the forwardly extending portion $a^1$, is a casing $a^3$ employed for a purpose hereinafter described. The forwardly extending portion $a^1$ is provided with side walls $a^4$—$a^4$ which diverge rearwardly to form the wall of the rearwardly arranged casing $a^3$. The base portion $a^1$ is further provided with a centrally arranged upstanding member $f$ having its sides $f^1$—$f^1$ arranged in a plane substantially parallel to the diverging sides $a^4$ of the frame. The casing $a^3$ is provided with a centrally arranged and upstanding bearing member $b$. A plurality of horizontally arranged drums $d$ and $d^1$, each having a peripheral groove $e$ and $e^1$, are respectively arranged within the said casing $a^3$ and one above the other to revolve around the upstanding member $b$. Arranged within the frame and above the forwardly extending portion $a^1$ thereof, are a pair of vertically arranged pulley $g$ and $g^1$, being respectively provided with peripheral grooves $g^3$ and $g^4$. These pulleys are respectively arranged between the upstanding member $f$ and the walls $a^4$ and are adapted to revolve on suitable bearings $m$ and $m^1$ respectively. These pulleys are each arranged in a plane substantially parallel to the opposite walls $a^4$—$a^4$ of the frame. One of the pulleys $g$ is preferably arranged at such an elevation that the center line of the lower horizontal drum $d$ would engage the bottom of the peripheral groove of said pulley, and the other pulley $g$ is preferably arranged in a higher plane than the first-mentioned pulley and in the same relation with the upper horizontal drum $d^1$ as the lower horizontal drum $d$ is to the first-mentioned vertical pulley $g$. Flexible transmission media $h$ and $h^1$ are employed, and are respectively adapted to pass over the vertical pulleys $g$ and $g^1$ and around the corresponding horizontal drums $d$ and $d^1$.

The invention further embodies a steering wheel which is composed of two semicircular or curved rack members $l$ and $m$ respectively. These members are respectively secured to the ends of the arms $k$ and $k^1$ by common fastening means $o$ and $o^1$ respectively. One of the members $m$ is secured to the underside of the ends of the said arms, and the other member $l$ is of a smaller radius than the other member, and is provided with outwardly curved ends $q$ and $q^1$. This member is arranged above and spaced from the larger member $n$, the ends $q$ and $q^1$ thereof being respectively secured to the top of the said ends of the arms $k$ and $k^1$ by the said fastening means $o$ and $o^1$ respectively. Each of these members is provided on the underside with a plurality of teeth $l^1$ and $m^1$ respectively. Thus, it will be seen that the steering wheel is composed of two semi-circular or arcuate members, each of which are horizontally disposed and spaced from one another.

The invention further comprises a pair of levers $c$ and $c^1$ which are respectively connected to the horizontal drums $d$ and $d^1$. The upper lever $c$ extends rearwardly beyond and below the upper semi-circular member $l$, and is provided with a dog $c^2$, which is adapted to engage in any of the teeth of the said member, and thereby lock the upper horizontal drum in various positions. The lower lever $c^1$ which is connected to the horizontal drum $d$ extends rearwardly through an opening $a^5$ of the casing and beyond and under the lower semi-circular member $m$. This lever is also provided with a dog $c^3$ which is adapted to engage in the plurality of teeth of the said member $m$, and thereby lock the upper horizontal drum in various positions. Each of the levers is provided with an upstanding knob $c^4$ and $c^5$ respectively. Thus, it will be seen that if either of the controlling members is given a horizontal movement, a vertical movement will be imparted to the flexible transmitting medium. While only two levers and corresponding pulleys have been shown and described, it is obvious that more could be employed without departing from the spirit of my invention.

What I claim is:—

1. In a flexible transmission controlling device for motor vehicles or the like, the combination with a substantially tubular member, of a frame mounted thereon, a hand wheel horizontally arranged and rearwardly extending from the said frame, horizontal drums mounted in the frame, vertical pulleys also mounted in the frame and in close proximity to the said horizontal drums, flexible transmitting media, and operating levers respectively secured to the horizontal drums and adapted to transmit a vertical movement to the flexible transmitting media.

2. In a flexible transmission controlling device for motor vehicles or the like, the combination with a substantially tubular member, of a frame mounted thereon and provided with a plurality of vertical pulleys and a corresponding number of horizontal drums which are arranged in close proximity to the said vertical pulleys, a plurality of spaced curved members extending rearwardly from the frame and disposed in a horizontal plane, flexible transmitting media attached to the horizontal drums and adapted to be led over the said vertical pulleys, and levers respectively secured to the horizontal drums for transmitting a vertical movement to the transmitting media, said levers extending rearwardly from the frame in a horizontal plane and arranged to respectively engage each of the curved members and thereby lock the said horizontal drums in various positions.

3. In a flexible transmission controlling device for motor vehicles or the like, the combination with a substantially tubular member, of a frame mounted thereon, spaced horizontal levers having drums carried thereby and arranged one above the other in a horizontal plane, vertical pulleys mounted in the frame and in such relation to the levers that the plane of each pulley is respectively at a tangent to the drum of the corresponding lever and at such a height that the plane of the pulley is at a tangent to the lever, and flexible transmitting media passing around said horizontal drums and adapted to be led therefrom over said vertical pulleys.

4. In a flexible transmission controlling device for motor vehicles or the like, the combination with a substantially tubular member, of a frame mounted thereon and provided with a cut-out portion, a centrally arranged upstanding bearing member located within the said cut-out portion, a plurality of vertical pulleys mounted in the said cut-out portion on said bearing member, a plurality of horizontal drums mounted on a common bearing and arranged in rear of and in close proximity to the said vertical pulleys, flexible transmitting media arranged to engage the said drums, and a plurality of horizontal levers respectively connected to the said horizontal drums, said levers being adapted to transmit a vertical movement to the flexible transmitting media through the said horizontal drums.

5. In a flexible transmission controlling device for motor vehicles or the like, the combination with a substantially tubular member, of a frame mounted thereon and provided with a forwardly extending base portion having side walls, and a centrally arranged bearing member extending upwardly from said portion between the walls, a casing formed by the frame and arranged above the base portion and provided with a central upstanding member, horizontal drums mounted one above the other on the upstanding member of the casing, vertical pulleys mounted in the bearing member of the base portion and at different heights so that the center lines of the horizontal drums will respectively engage the tops of the vertical pulleys, oppositely arranged arms extending from the frame, a hand wheel formed of a plurality of curved members having their respective ends secured to the top and bottom of the ends of said arms by a common fastening means, each of the said members being provided on its underside with a plurality of teeth, flexible transmitting media passing around the horizontal drums and adapted to be led over the said vertical pulleys, and a plurality of levers respectively connected to the horizontal drums and extending rearwardly in a horizontal plane and adapted to respectively engage the teeth of the said curved members, said levers being adapted to impart a vertical movement to a flexible transmitting media.

6. In a flexible transmission controlling device for motor vehicles or the like, comprising a substantially tubular member, a frame mounted thereon, a plurality of horizontally-arranged drums mounted in the frame one above the other, a plurality of levers directly connected to and operating the said drums, a plurality of vertical pulleys also mounted in the frame, flexible transmitting media passing around the horizontal drums and over the vertical pulleys, the latter being arranged in different vertical planes so as to accord with the arrangement of the horizontal drums, and also disposed at a tangent to the horizontal drums, and curved rack members extending from the frame and located one above the other and adapted to be engaged by the said levers at different points of their movement.

7. In a flexible transmission controlling device for motor vehicles or the like, comprising a substantially tubular member, a frame mounted thereon, a plurality of horizontally-arranged drums mounted in the frame one above the other, a plurality of levers directly connected to and operating the said drums, a plurality of vertical pulleys also mounted in the frame, flexible transmitting media passing around the horizontal drums and over the vertical pulleys, the latter being arranged in different vertical planes so as to accord with the arrangement of the horizontal drums, and also disposed at a tangent to the horizontal drums, and means for adjusting and locking the levers at different points of their movement.

In testimony, that I claim the foregoing as my invention, I have signed my name in presence of two subscribing witnesses.

GEORGE FREDERICK LARKIN.

Witnesses:
J. S. WIMER,
W. CHARLES.